June 19, 1934.  A. C. WEIDANZ  1,963,637
GUARD FOR WINDSHIELD WIPER BLADES
Filed Aug. 14, 1933
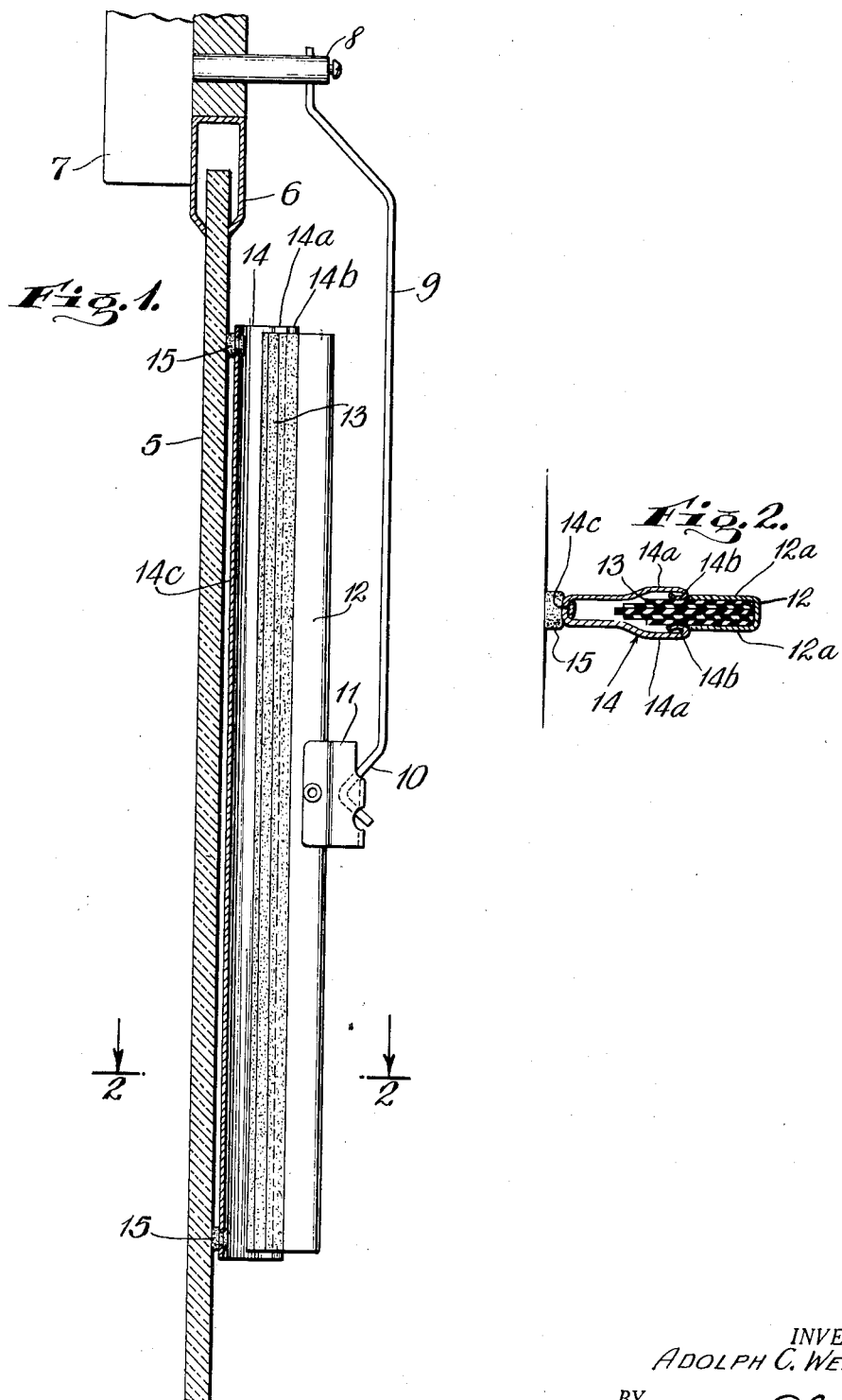
INVENTOR.
ADOLPH C. WEIDANZ
BY
ATTORNEY Patented June 19, 1934

1,963,637

UNITED STATES PATENT OFFICE 1,963,637

GUARD FOR WINDSHIELD WIPER BLADES

Adolph C. Weidanz, East Elmhurst, Long Island, N. Y.

Application August 14, 1933, Serial No. 684,939

2 Claims. (Cl. 15—250)

This invention relates to windshield wipers such as commonly employed in connection with the windshields of motor vehicles for removing rain, mist and other foreign matter to provide clear vision through the windshield in the operation of the vehicle, and particularly to the provision of a guard or protector for the blades of wipers of the class under consideration to preserve and maintain the operative characteristics of the blade during the long stresses or periods of time that the blade is not in use while attached to the motor vehicle; and the object of the invention is to provide a channel-shaped guard or protector of the class described which is simple and economical in construction and practical in use, and further, to the provision of means on said guard for cushioning the support thereof in connection with the windshield and to aid in retaining the guard as well as the windshield blade against accidental movement over the windshield; and with these and other objects in view, the invention consists in a device of the class and for the purpose specified, which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view of a part of a windshield indicating a wiper supported in spaced relation thereto by one of my improved guard devices; and, Fig. 2 is a section on the line 2—2 of Fig. 1, on an enlarged scale.

With windshield wipers of the class under consideration, it is a common experience and practice to support the blade or blades of the wiper upon the windshield under the tensional means employed to insure proper functioning of the wiper blade over the windshield, and it is also commonly known that these blades remain stationary for long periods of time without call for the use thereof.

Under this tensional support, the rubber wiper edges of the blades are tensionally supported in a flexed position upon the windshield and the weather or elements operate to maintain the rubber wiper edges of the blades in their distorted position so that when need for the windshield wiper is required, the same, oftentimes, is found to be inoperative to produce the desired results by reason of the said distortion. The nuisance and seriousness of this improper operation of the wiper blade causes considerable inconvenience to the operator of the vehicle, and further, may lead to accidents by reason of the lack of clear vision which would otherwise be afforded by the proper operation of the windshield wiper.

It is the purpose of my invention to overcome and eliminate these objectionable and impractical features of windshield wipers by providing a guard and protector which in the first place will support the rubber wiping edge of the blade at all times in an extended position instead of a distorted position, and further, will act as a shield protecting the wiper blade to a major degree from the action of the elements, thus increasing the operative life of the blade, and insuring the proper functioning thereof at all times.

For the purpose of illustrating my invention, I have indicated in Fig. 1 of the drawing, a part of a windshield 5 supported in the usual frame 6. At 7, I have indicated a wiper mechanism to the shaft 8 of which is secured the oscillating arm 9 having an offset or hook end 10, detachable with respect to a U-shaped bracket piece 11, to which is pivotally supported the channel casing 12 of a wiper blade in which is supported a plurality of strips or sheets of rubber to form the wiper element proper 13. This element, in the construction shown, is made from strips of rubber of different widths in accordance with a common method of construction. However, the element may be of any desired structure.

At 14, I have shown one of my improved guards which is in the form of a channel body of a length equal to or slightly greater than the length of the wiper element 13 and in which that part of the element 13 protruding beyond the casing 12 is adapted to be supported as is clearly seen in the drawing. The guard 14 has its side members offset outwardly at the outer end as seen at 14a to give ample room for the element 13 in the channel of the guard, and the ends of the side members 14a are bent in or beaded as seen at 14b so as to provide a reinforcement for said edges and also smooth or rounded surfaces to engage the element 13 adjacent the free ends of the side members 12a of the channel casing 12.

To the free ends of the crosshead 14c of the guard 14 are secured pegs 15 which project outwardly beyond said crossheads so as to engage the surface of the windshield 5, and support the crosshead 14c in spaced relation with respect to said windshield. The pins 15 are preferably composed of cushioning material such as felt, rubber and the like, but may be composed of other material, and these pins are employed when the guard 14 is composed of metal or other hard material which might scratch or otherwise mar the surface of the glass. In constructing the guard of other softer materials, such for example, as a channel strip of waterproof cardboard, the use of the blocks or feet 15 is not absolutely essential.

In the use of my invention, it will be understood that the guard will be mounted on the wiper blade and remain thereon as long as the windshield wiper is not in use so as to support that part of the wiper element 13 which protrudes beyond the casing 12 in a straight or parallel position with respect to the longitudinal plane of the casing instead of in a kinked or angular distorted position as would be assumed thereby if the guard were removed. In this way, the wiper blade will be retained in position for proper use at all times, and when the use thereof is required.

It will be understood that the guard may be attached by simply placing the same over the wiper element 13 so as to insert the protruding portion of said element within the channel of the guard, the beads 14b serving to frictionally engage the element 13. However, the spring tension to which the wiper blade is subjected will serve to support the guard or the feet 15 thereof in firm engagement with the windshield 5, preventing displacement of the parts. It will also be understood in this connection that the guard may be attached and detached by lengthwise movement of the guard with respect to the wiper blade.

It will be apparent that while I have illustrated the guard as mounted on the protruding wiper portion of the element 13, in some cases the casing 12 may be forced into the enlarged portion 14a so that the beads 14b will rest upon the outer surfaces of the side members 12a of the casing 12. This mounting would be practical and desirable in some types of windshield wipers, and the guard is constructed for such use, as will clearly appear from a consideration of Fig. 2 of the drawing.

It will be understood that my improved guard is not necessarily limited for use in connection with wiper elements of the class herein referred to, as the same is applicable to other devices of this class, regardless of the use thereof, and various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. A guard for the blades of windshield wipers including a backing bar and a flexible wiper element, said guard comprising a member mounted in connection with the blade and of a length equal to the length of said blade, said member including a crosshead disposed in spaced relation to the outer end of the wiper element of said blade, means on said member for retaining the same against displacement from the blade, said crosshead being arranged adjacent and supported on the windshield controlled by said wiper, and the end portions of said member having outwardly projecting feet engaging the windshield.

2. A guard for the blades of windshield wipers including a backing bar and a flexible wiper element, said guard comprising a member mounted in connection with the blade and of a length equal to the length of said blade, said member including a crosshead disposed in spaced relation to the outer end of the wiper element of said blade, means on said member for retaining the same against displacement from the blade, said crosshead being arranged adjacent and supported on the windshield controlled by said wiper, the end portions of said member having outwardly projecting feet engaging the windshield, and said feet being composed of cushioning material.

ADOLPH C. WEIDANZ.